(12) United States Patent
Kodama et al.

(10) Patent No.: US 7,980,701 B2
(45) Date of Patent: Jul. 19, 2011

(54) COLOR COMBINING OPTICAL SYSTEM AND IMAGE PROJECTION APPARATUS USING THE SAME

(75) Inventors: Hiroyuki Kodama, Utsunomiya (JP); Yu Yamauchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 12/104,218

(22) Filed: Apr. 16, 2008

(65) Prior Publication Data
US 2008/0266526 A1 Oct. 30, 2008

(30) Foreign Application Priority Data
Apr. 24, 2007 (JP) ................ 2007-114332

(51) Int. Cl.
G03B 21/14 (2006.01)
G03B 21/26 (2006.01)
G02F 1/1335 (2006.01)
G02F 1/00 (2006.01)

(52) U.S. Cl. ............ 353/20; 353/31; 353/94; 349/97; 349/5; 348/751

(58) Field of Classification Search ............ 353/20, 353/31, 94; 349/97, 5; 369/13.29; 359/487; 348/751
See application file for complete search history.

(56) References Cited

U.S. PATENT DOCUMENTS

| | | | |
|---|---|---|---|
| 5,580,142 A * | 12/1996 | Kurematsu et al. ........ 353/31 |
| 6,626,540 B2 | 9/2003 | Ouchi |
| 6,926,411 B2 | 8/2005 | Ouchi |
| 7,008,059 B2 * | 3/2006 | Oakuyama et al. ........ 353/20 |
| 7,044,607 B2 | 5/2006 | Ouchi |
| 7,287,861 B2 * | 10/2007 | Nakayama ............... 353/31 |
| 7,595,848 B2 * | 9/2009 | Abe ...................... 349/5 |
| 2002/0140905 A1 | 10/2002 | Ouchi |
| 2004/0027543 A1 | 2/2004 | Ouchi et al. |
| 2005/0140939 A1 * | 6/2005 | Yamamoto ............. 353/102 |
| 2005/0243280 A1 | 11/2005 | Ouchi et al. |
| 2006/0044516 A1 * | 3/2006 | Inoko ................... 353/20 |
| 2006/0187416 A1 | 8/2006 | Ouchi et al. |
| 2007/0071043 A1 | 3/2007 | Yamauchi et al. |

FOREIGN PATENT DOCUMENTS

| | | |
|---|---|---|
| CN | 1932585 A1 | 3/2007 |
| EP | 1631093 A1 | 3/2006 |
| EP | 1762882 A1 | 3/2007 |
| JP | 2001-154152 A | 6/2001 |
| JP | 2003-021807 A | 1/2003 |

* cited by examiner

*Primary Examiner* — Georgia Y Epps
*Assistant Examiner* — Magda Cruz
(74) *Attorney, Agent, or Firm* — Canon USA, Inc. IP Div

(57) ABSTRACT

A color combining optical system includes a first polarization splitting surface for light in a first wavelength range, and a second polarization splitting surface for light in a second and third wavelength range. The first polarization splitting surface guides illumination light in the first wavelength range to a first liquid crystal display (LCD) element and guides image light reflected from the first LCD element to a direction different from the illumination light. The second polarization splitting surface separates illumination light in the second and third wavelength range from each other, guides them to a second and third LCD element, respectively, and combines image light reflected from the second LCD element with image light reflected from the LCD element to guide combined light to the first polarization splitting surface which combines the image light reflected from the first LCD element with the combined light.

9 Claims, 9 Drawing Sheets

COLOR COMBINING OPTICAL SYSTEM AND IMAGE PROJECTION APPARATUS USING THE SAME

BACKGROUND OF THE INVENTION

1. Field of the Invention

The present invention relates to a color combining optical system (color separating-combining optical system). More particularly, the present invention relates to a color combining optical system for use in an image projection apparatus, such as a liquid-crystal projector, and to an image projection apparatus.

2. Description of the Related Art

U.S. Pat. No. 6,626,540 discusses a color separating-combining optical system for use in a reflective liquid-crystal projector, in which a dichroic mirror and three polarizing beam splitters (PBSs) are located on an optical path between an illumination optical system and a projection optical system. However, the number of components of the color separating-combining optical system is large. Further miniaturization of the color separating-combining optical system is required.

Japanese Patent Application Laid-Open No. 2003-021807 discusses a liquid-crystal projector configured with one PBS and one dichroic prism. Consequently, miniaturization of a liquid-crystal projector is achieved.

However, in the liquid-crystal projector discussed in Japanese Patent Application Laid-Open No. 2003-021807, image light reflected from a liquid crystal panel passes through a dichroic prism before being analyzed by the PBS. Thus, a polarization state of image light immediately after being reflected from the liquid crystal panel is changed by the image light passing through the dichroic prism. Consequently, contrast of a projected image is reduced.

SUMMARY OF THE INVENTION

The present invention is directed to a color combining optical system which can have a smaller number of components, which can output image light with high contrast. The present invention is directed also to an image projection apparatus using such a color combining optical system.

According to an aspect of the present invention, a color combining optical system includes a first polarization splitting surface having a polarization splitting characteristic for light in a first wavelength range, and a second polarization splitting surface having a polarization splitting characteristic for light in a second and third wavelength range. The first polarization splitting surface is configured to guide illumination light in the first wavelength range to a first liquid crystal display (LCD) element and guide image light reflected from the first liquid crystal display element in a direction different to the direction of the illumination light. The second polarization splitting surface is configured to separate illumination light in the second wavelength range and illumination light in the third wavelength range from each other, to guide the illumination light in the second wavelength range to a second liquid crystal display element, and to guide the illumination light in the third wavelength range to a third liquid crystal display element, and to combine image light reflected from the second liquid crystal display element with image light reflected from the third liquid crystal display element to guide combined light to the first polarization splitting surface. The first polarization splitting surface is configured to combine the image light reflected from the first liquid crystal display element with the combined light obtained by the second polarization splitting surface combining the image light reflected from the second liquid crystal display element with the image light reflected from the third liquid crystal display element.

According to another aspect of the present invention, an image projection apparatus includes first, second, and third liquid crystal display elements, a projection optical system configured to project image light from the first, second, and third liquid crystal display elements, and a color combining optical system configured to guide light from a light source to the first, second, and third liquid crystal display elements and to guide image light from the first, second, and third liquid crystal display elements to the projection optical system. The color combining optical system includes a first polarization splitting surface having a polarization splitting characteristic for light in a first wavelength range, and a second polarization splitting surface having a polarization splitting characteristic for light in a second wavelength range and light in a third wavelength range. The first polarization splitting surface is configured to guide illumination light in the first wavelength range to a first liquid crystal display element and to guide image light reflected from the first liquid crystal display element in a direction different to a direction of the illumination light. The second polarization splitting surface is configured to separate illumination light in the second wavelength range and illumination light in the third wavelength range from each other, to guide the illumination light in the second wavelength range to a second liquid crystal display element and the illumination light in the third wavelength range to a third liquid crystal display element, and to combine image light reflected from the second liquid crystal display element with image light reflected from the third liquid crystal display element to guide combined light to the first polarization splitting surface. The first polarization splitting surface is configured to combine the image light reflected from the first liquid crystal display element with the combined light obtained by the second polarization splitting surface combining the image light reflected from the second liquid crystal display element with the image light reflected from the third liquid crystal display element.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Figure 1:
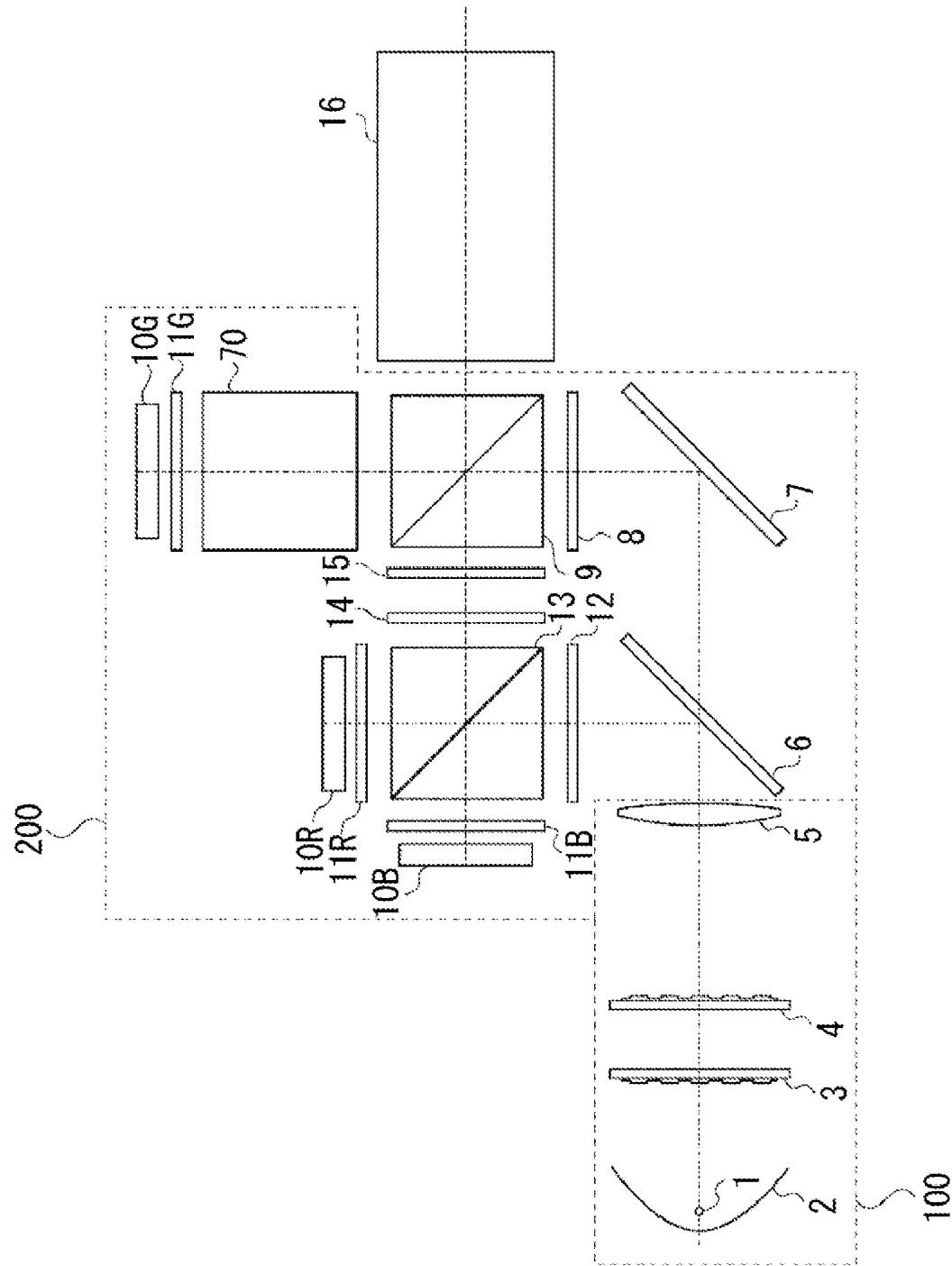
FIG. 1 illustrates a configuration of an image projection apparatus according to a first exemplary embodiment of the present invention.

Various exemplary embodiments, features, and aspects of the invention will now be described in detail with reference to the drawings.

Hereinafter, color combining optical systems according to exemplary embodiments and image projection apparatuses respectively having the color combining optical systems are described in detail. In the following first, second, third, and fourth exemplary embodiments, image projection apparatuses are described. However, the present invention can be implemented by a part of a color combining optical system 200 in the image projection apparatus. More specifically, as is apparent from the fourth exemplary embodiment, the present invention can also be implemented by a color combining optical system that does not include dichroic mirrors 6, 26, and 46, and mirrors 7, 27, and 47, which are included as constituent elements in the first through third exemplary embodiments.

More specifically, a color combining optical system according to an exemplary embodiment of the present invention includes a first polarization splitting surface having a polarization splitting characteristic (polarization splitting function) for light in a first wavelength range, and a second polarization splitting surface having a polarization splitting characteristic (polarization splitting function) for light in a second wavelength range and light in a third wavelength range. The first polarization splitting surface guides illumination light in the first wavelength range to a first liquid crystal display element and guides image light reflected from the first liquid crystal display element in a direction different from the direction of the illumination light. Further, the second polarization splitting surface separates illumination light in the second wavelength range and illumination light in the third wavelength range from each other, guides the illumination light in the second wavelength range to a second liquid crystal display element and the illumination light in the third wavelength range to a third liquid crystal display element. Moreover, the second polarization splitting surface combines image light reflected from the second liquid crystal display element with image light reflected from the third liquid crystal display element to guide combined light to the first polarization splitting surface. Finally, the first polarization splitting surface combines the image light reflected from the first liquid crystal display element with the combined light obtained by the second polarization splitting surface combining the image light reflected from the second liquid crystal display element with the image light reflected from the third liquid crystal image display element.

According to an exemplary embodiment of the present invention, the polarization splitting characteristic (polarization splitting function) is a characteristic (function) to reflect light having one polarization direction and to transmit the light having other polarization directions. Although an ideal characteristic (function) is to reflect and transmit 100% of the incident light, it is desirable to reflect and transmit at least 50% (preferably 75% or more) of the incident light.

In the following exemplary embodiments of the present invention, it is assumed that the light in the first wavelength range is green light, the light in the second wavelength range is blue light, and the light in the third wavelength range is red light. Of curse, any color light can be selected as light in each of the first, second, and third wavelength ranges.

With such a configuration, the present invention can provide a color combining optical system that is capable of decreasing the number of components and emitting high-contrast image light. In addition, the present invention can provide an image projection apparatus using such a color combining optical system, which is capable of obtaining a high-contrast projection image.

First Exemplary Embodiment

The first exemplary embodiment of the present invention is described with reference to FIGS. 1 and 2. In the first exemplary embodiment, white light emitted from a light source 1 is guided to reflective liquid crystal display elements (image display elements) 10R, 10G, and 10B via an illumination optical system 100. Image light emerging from each of the reflective liquid crystal display elements 10R, 10G, and 10B (respectively corresponding to the first, the second, and the third liquid crystal display elements) is projected onto a projection surface, such as a screen, via a projection optical system 16 (e.g., a projection lens). However, the projection optical system 16 is not limited to a lens. A color combining optical system 200 for performing color separation of illumination light fluxes having passed through the illumination optical system 100 and for guiding separated light fluxes to the reflective liquid crystal display elements 10R, 10G, and 10B is located between the illumination optical system 100 and the projection optical system 16. The color combining optical system 200 has also a function of combining image light emerging from the reflective liquid crystal display elements 10R, 10G, and 10B to guide combined image light to the projection optical system 16.

First, the illumination optical system 100 is described below with reference to FIG. 1. Each of the illumination optical system 100 and the color combining optical system 200 is illustrated within a dashed line box in FIG. 1. Dot-dash-lines represent optical paths of principal rays (corresponding to optical axes of an optical system for guiding three color light rays from the light source 1 to the screen) of bundles of light rays, which are respectively incident on the centers of the three reflective liquid crystal display elements 10R, 10G, and 10B and emerge from the centers thereof so as to be projected onto the screen.

Light fluxes emitted in all directions from the light source (i.e., a light emitting portion of the lamp) 1 are reflected by a paraboloid reflector 2 to become parallel light fluxes. The parallel light fluxes are divided into a plurality of partial light fluxes by a first lens array 3. The partial light fluxes are converged by the first lens array 3 to the vicinity of a second lens array 4, so that each of the partial light fluxes forms a (secondary) light source image. Divided light fluxes exiting from the second lens array 4 are condensed by a condenser lens 5 to superposedly illuminate the reflective liquid crystal display elements 10R, 10G, and 10B. An infrared-cut filter (not shown) can be located at the light source side of the first lens array 3.

A polarization conversion element (not shown) is located immediately posterior to the second lens array 4 (i.e., on the light source side of the condenser lens 5). The polarization conversion element converts the above-described plurality of partial light fluxes into linear polarized light (e.g., p-polarized light) having the same polarization direction. The polarization conversion element is configured by arranging a plurality of polarization conversion elements as an array (in a direction in which the plurality of polarization conversion elements intersect the optical axis of the illumination optical system 100, or in a direction in which the plurality of lenses of the second lens array 4 are arranged). The polarization conversion element converts unpolarized light into linear polarized light (e.g., p-polarized light). Therefore, the polarization conversion element (not shown) can be referred to as a polarization conversion element array.

Light fluxes (illumination light fluxes) exiting from the illumination optical system 100, configured in the above-described manner, are guided to the color combining optical system 200.

Next, the color combining optical system 200 is described below with reference to FIGS. 1 and 2.

A dichroic mirror 6 has a characteristic to reflect color light, e.g., blue light (corresponding to the light in the second wavelength range, second color light, or B) and red light (corresponding to the light in the third wavelength range, third color light, or R) included in white light emitted from the light source 1, and to transmit color light, e.g., green light (corresponding to the light in the first wavelength range, first color light, or G). Generally, blue light has a wavelength range of from about 400 nm to about 500 nm. Green light has a wavelength range of from about 500 nm to about 600 nm. Red light has a wavelength range of from about 600 nm to about 700 nm. That is, the first color light, the second color light, and the third color light differ from one another in wavelength range.

The optical path of green light having passed through the above-described dichroic mirror 6 is described below.

A mirror 7 reflects green light having passed through the dichroic mirror 6. An entrance-side polarizing plate (i.e., a light source side polarizing plate, an entrance-side polarizing plate for green light, or a first entrance-side polarizing plate) 8 transmits only p-polarized light (corresponding to an intended polarization direction) and absorbs or reflects s-polarized light (corresponding to a polarization direction perpendicular to the intended polarization direction). A first polarizing beam splitter 9 has a polarization splitting surface (first polarization splitting surface) that transmits p-polarized light (first linear polarized light) and reflects s-polarized light (second linear polarized light) whose polarization direction is perpendicular to that of p-polarized light. The term "polarization splitting surface" can designate a surface on which a polarization splitting film (i.e., a film having a polarization splitting function) is applied or can designate a surface to which two prisms are cemented. The polarization splitting film (i.e., a film having a polarization splitting function) has a function of separating light fluxes, whose polarization components are perpendicular to each other, from each other by transmitting a light flux having a given linear polarization component and reflecting a light flux having a linear polarization component that is perpendicular to that of the given linear polarization component. The polarizing plate can be an optical element (including a film) having a function of transmitting a light flux having a given linear polarization component and of reflecting or absorbing (i.e., of not transmitting) a light flux having a polarization component perpendicular to the given polarization component.

The reflective liquid crystal display element 10G for green (green light) reflects incident light and performs image modulation. An optical element 11G is a quarter-wavelength plate for green light. An optical path adjusting prism 70 is used to adjust the optical path. The optical path adjusting prism 70 is an optical element for substantially equalizing the optical paths of the color light fluxes from the reflective liquid crystal display elements 10R, 10G, and 10B to the screen (projection surface) (for example, setting the shortest one of the optical paths to be equal to or more than 90%, alternatively, 97% of the longest one of the optical paths). Green light (illumination light), which is p-polarized light transmitted by the polarizing beam splitter 9, is incident on the reflective liquid crystal display element 10G for green light via the optical path adjusting prism 70 and the quarter-wavelength plate 11G. The green light having been incident on the reflective liquid crystal display element 10G undergoes image modulation (for example, a part of the green light is modulated into s-polarized light). Then, the modulated light reflected from the reflective liquid crystal display element 10G enters the first polarizing beam splitter 9 via the optical path adjusting prism 70 and the quarter-wavelength plate 11G. Further, s-polarized light (image light) included in the green light incident on the first polarizing beam splitter 9 is reflected from the polarization splitting surface to be guided to the projection optical system 16. Thus, the image light obtained from the green light is projected onto the projection surface. Incidentally, s-polarized light obtained from the green light is referred to as image light. Light to be guided to the projection optical system 16 and to be projected on the projection surface, that is, light whose polarization direction is changed from that of p-polarized light to that of s-polarized light (or from that of s-polarized light to that of p-polarized light) by the reflective liquid crystal display element 10G, is referred to as image light.

The optical paths of blue light and red light reflected from the above-described dichroic mirror 6 are described next.

An entrance-side polarizing plate (i.e., a light source side polarizing plate, an entrance-side polarizing plate for red light and blue light, a polarizing plate for white light, or a second entrance-side polarizing plate) 12 transmits p-polarized light (corresponding to an intended polarization direction) from the red light and the blue light, and absorbs or reflects s-polarized light. The red light and the blue light having passed through the entrance-side polarizing plate 12 are incident on a second polarizing beam splitter 13 as p-polarized light.

Figure 2:
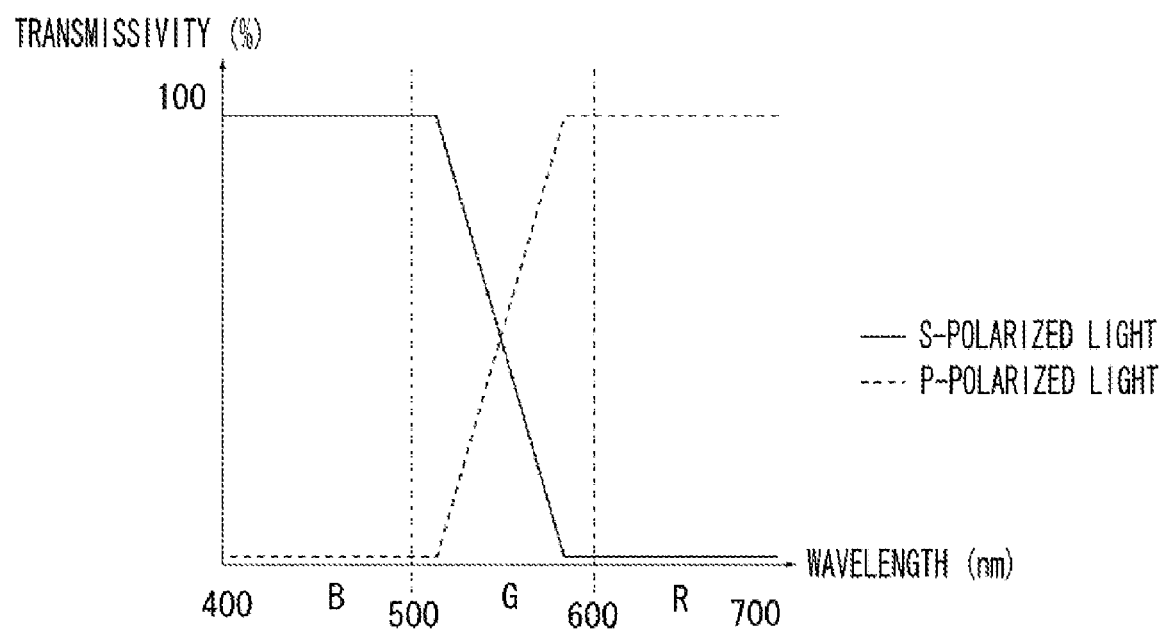
FIG. 2 illustrates a polarization split characteristic of a second polarizing beam splitter of the image projection apparatus according to the first exemplary embodiment of the present invention.

The second polarizing beam splitter 13 has a wavelength characteristic (i.e., a polarization splitting characteristic, or a polarization splitting function) illustrated in FIG. 2. That is, the second polarizing beam splitter 13 has a polarization splitting surface (a surface on which a polarization splitting film is applied, a surface across which two prisms face each other, or the second polarization splitting surface), whose polarization splitting characteristic for red light is an inverse of the polarization splitting characteristic for blue light. More specifically, the second polarizing beam splitter 13 transmits s-polarized blue light and reflects p-polarized blue light. On the other hand, the second polarizing beam splitter 13 reflects s-polarized red light and transmits p-polarized red light.

Accordingly, the p-polarized blue light, which has been incident on the second polarizing beam splitter 13, is reflected and is then incident on the reflective liquid crystal display element 10B for blue (blue light) via a quarter-wavelength plate 11B. Subsequently, the blue light modulated and reflected from the reflective liquid crystal display element 10B for blue (blue light) enters the second polarizing beam splitter 13 via the quarter-wavelength plate 11B. The s-polarized light (image light), into which the blue light having been incident on the second polarizing beam splitter 13 is modulated by the liquid crystal display element 10B, passes through the second polarizing beam splitter 13 and is guided towards the projection optical system 16.

Further, the p-polarized red light, which has been incident on the second polarizing beam splitter 13, is passed and then incident on the reflective liquid crystal display element 10R for red (red light) via a quarter-wavelength plate 11R. Subsequently, the red light (image light) modulated and reflected from the reflective liquid crystal display element 10R for red (red light) enters the second polarizing beam splitter 13 via the quarter-wavelength plate 11R. The s-polarized light, into which the red light having been incident on the second polarizing beam splitter 13 is modulated by the liquid crystal display element 10R, is reflected from the second polarizing beam splitter 13 and is guided towards the projection optical system 16.

Thus, the s-polarized light fluxes of red light and blue light, which have been guided towards the projection optical system 16 from the second polarizing beam splitter 13, are incident on an exit-side polarizing plate 14, which transmits s-polarized light and absorbs or reflects p-polarized light. Then, s-polarized light exiting from the exit-side polarizing plate 14 is incident on a half-wavelength plate 15 to be converted into p-polarized light. Subsequently, p-polarized light fluxes of red light and blue light exiting from the half-wavelength plate 15 pass through the first polarizing beam splitter 9. Then, the transmitted blue and red light fluxes are incident on the projection optical system 16 and are projected onto the projection surface.

In a case where a black display is performed, green light is again incident on the first polarization beam splitter 9 in a state in which all of the green light reflected from the reflective liquid crystal display element 10G for green light is p-polarized light. Then, the green light passes through the first polarizing beam splitter 9 and returns towards the light source 1. Similarly, red light reflected from the reflective liquid crystal display element 10R for red light passes through the second polarizing beam splitter 13 in a state in which all of the red light is p-polarized light. Then, the red light returns towards the light source 1. Blue light reflected from the reflective liquid crystal display element 10B for blue light passes through the second polarizing beam splitter 13 in a state in which all of the blue light is p-polarized light. Then, the blue light returns towards the light source 1. Light that is not image light (for example, light that is not modulated by the liquid crystal display element and is not changed in the polarization direction) returns towards the light source 1 similar to the light in the case where a black display is performed.

Figure 8:
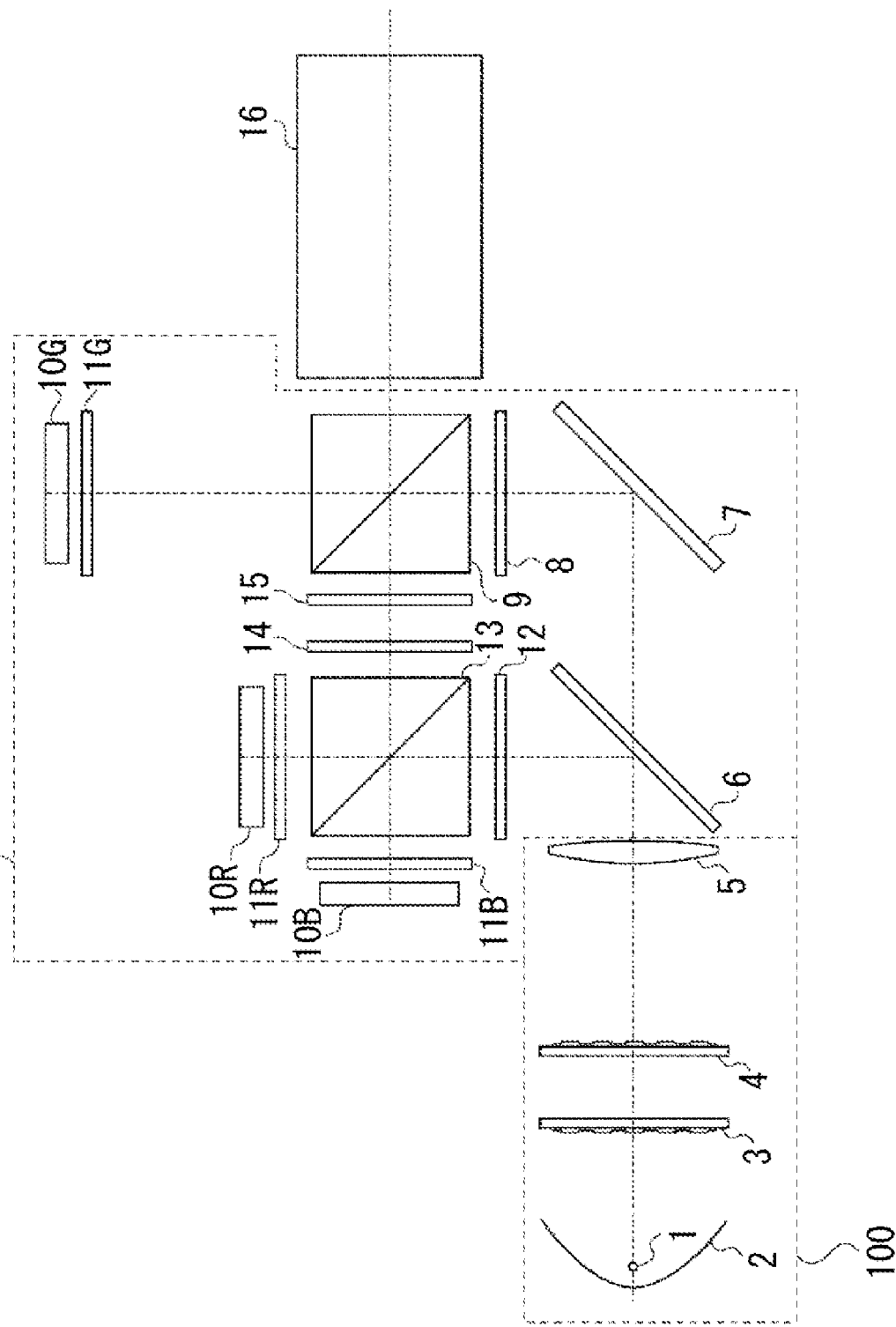
FIG. 8 illustrates a configuration of an image projection apparatus according to a first modification of the first exemplary embodiment of the present invention.

According to the first exemplary embodiment, the optical path adjusting prism 70 is located between the first polarizing beam splitter 9 and the liquid crystal display element 10G (at the liquid crystal display element side of the first polarizing beam splitter 9). However, the configuration of the first exemplary embodiment according to the present invention is not limited thereto. For example, as illustrated in FIG. 8, a space can be provided between the first polarizing beam splitter 9 and the reflective liquid crystal display element 10G (a first modification of the first exemplary embodiment), without locating the optical path adjusting prism 70. In this case, at least, the distance between the first polarizing beam splitter 9 and the reflective liquid crystal display element 10G for green light can be set to be larger than the distance between the second polarizing beam splitter 13 and the reflective liquid crystal display element 10B or 10R for blue light or red light. Alternatively, the distances (the back-focuses on the optical paths) from the projection optical system 16 (i.e., an optical surface closest to the side of the reflective liquid crystal display element among a plurality of optical surfaces, such as lens surfaces, of the projection optical system 16) to the reflective liquid crystal display elements 10R, 10G, and 10B can be made substantially equal to one another. Thus, in a case where the optical path lengths from the projection optical system 16 to the reflective liquid crystal display elements 10R, 10G, and 10B can be made substantially equal to one another (the shortest optical path is equal to or more than 90% or 97% of the longest optical path), an image formed from one color light can be prevented from being blurred or from differing from images formed from other color light fluxes in magnification. Apparently, without locating the optical path adjusting prism 70 as illustrated in FIG. 8, the distance between the reflective liquid crystal display element 10G and the first polarization beam splitter 9 (the projection optical system 16) can be reduced within a range in which the image quality of a projection image is not degraded (or in a range in which the degradation of the image quality is tolerable even when the image quality of a projection image is degraded).

Figure 9:
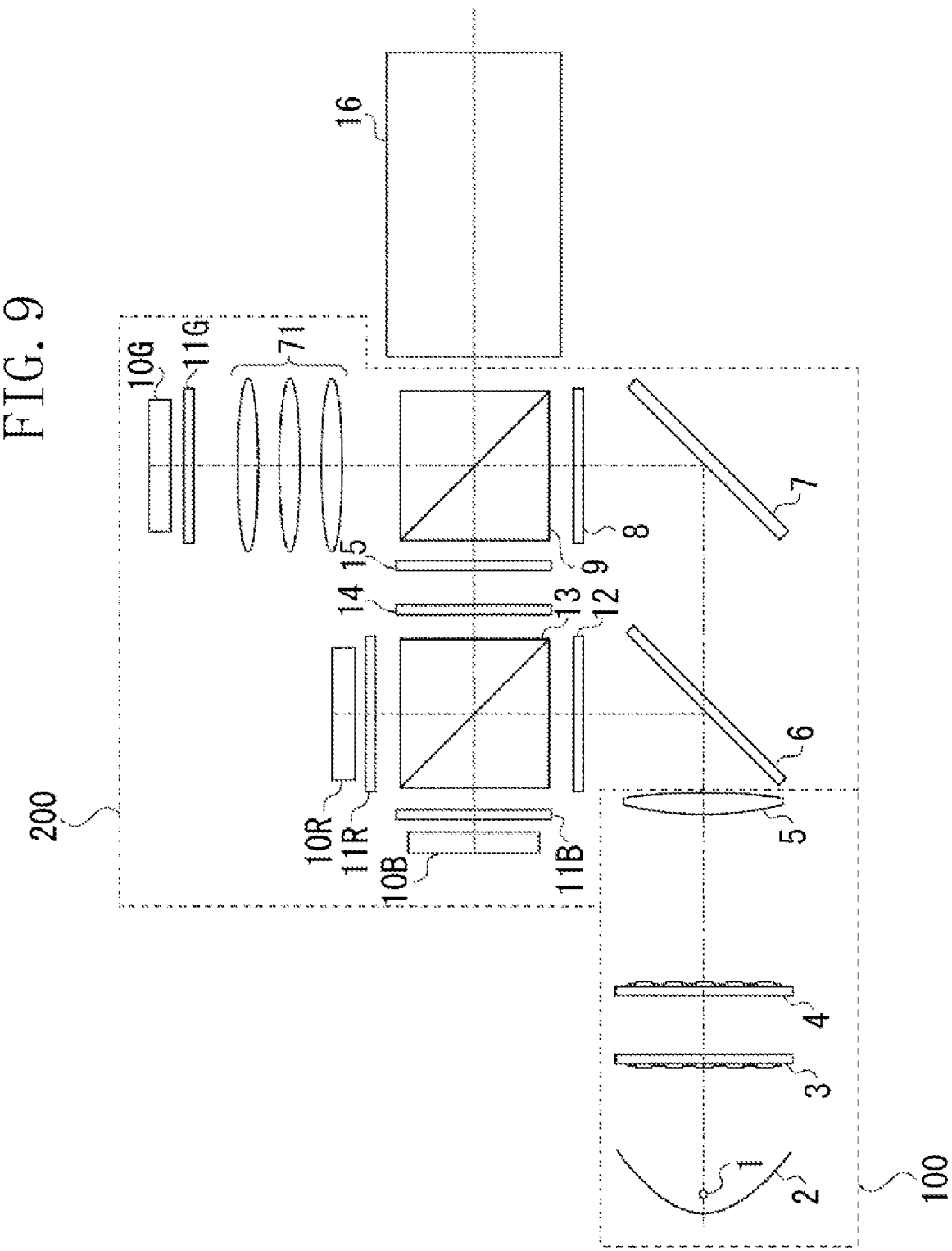
FIG. 9 illustrates a configuration of an image projection apparatus according to a second modification of the first exemplary embodiment of the present invention.

Alternatively, for example, as illustrated in FIG. 9, an optical element 71, such as a lens, can be located between the first polarizing beam splitter 9 and the liquid crystal display element 10G or the quarter-wavelength plate 11G (a second modification of the first exemplary embodiment).

Alternatively, an optical element, such as a lens, can be located between the first polarizing beam splitter 9 and each of the liquid crystal display elements 10R and 10B (i.e., at the second liquid crystal display element side and/or the third liquid crystal display element side of the first polarizing beam splitter 9). At that time, a lens, which is common to the optical path of red light and the optical path of blue light, can be located between the first polarizing beam splitter 9 and the second polarizing beam splitter 13. Alternatively, different lenses can be located between the reflective liquid crystal display element 10R for red light and the second polarizing beam splitter 13 and between the reflective liquid crystal display element 10B for blue light and the second polarizing beam splitter 13, respectively.

Alternatively, the optical path length difference can be corrected by applying color aberration to the projection optical system 16. At that time, color aberration can be applied thereto by considering the fact that only the optical path of green light is short in comparison with the optical paths of red light and blue light. In this case, apparently, the term "lens" designates an optical element having an optical power (i.e., the reciprocal of a focal length, or refractive power) Diffractive optical elements can be located between the reflective liquid crystal display element 10R for red light and the second polarizing beam splitter 13 and between the reflective liquid crystal display element 10B for blue light and the second polarizing beam splitter 13, respectively. Alternatively, optical surfaces having an optical power (refractive power) can be provided, instead of the lenses, by providing a curvature in or a diffractive surface on each of existing optical elements.

In a case where the distances (optical path lengths) from the light source 1 (or the second lens array 4, on which a secondary optical source image is formed) to the reflective liquid crystal display elements 10R, 10G, and 10B differ from one another, illuminance distributions on the three reflective liquid crystal display elements 10R, 10G, and 10B may differ from one another. More specifically, although the distance from the light source 1 to the reflective liquid crystal display element 10R for red light is equal to that from the light source 1 to the reflective liquid crystal display element 10B for blue light in the first exemplary embodiment, only the distance from the light source 1 to the reflective liquid crystal display element 10G for green light is longer. In this case, the illumination distribution on the reflective liquid crystal display element 10G for green light differs from that on the reflective liquid crystal display element 10R for red light and that on the reflective liquid crystal display element 10B for blue light. Thus, there is a possibility that even when the illumination distribution on one of the reflective liquid crystal display elements is uniform, the illumination distribution on another of the reflective liquid crystal display elements may be nonuniform.

Thus, it is useful for equalizing the illumination distributions on the three reflective liquid crystal display elements 10R, 10G, and 10B to locate an optical element on an optical path from the dichroic mirror 6 to the first polarizing beam splitter 9. This optical element has an optical power (light-collecting power, or refractive power) like a refractive lens and a diffractive optical element. The illumination distributions on the three reflective liquid crystal display elements 10R, 10G, and 10B can be made using such optical elements to be substantially the same as one another. More specifically, a light source image (hereunder sometimes referred to as a third-order light source) is formed on an optical path from the dichroic mirror 6 to the first polarizing beam splitter 9. Then, the reflective liquid crystal display element 10G for green is illuminated with a light flux emitted from the third-order light source (by Kohler illumination). Consequently, the optical positions of the three reflective liquid crystal display elements 10R, 10G, and 10B with respect to the light source can be made by the additional optical element to be substantially the same as one another. Thus, all of the three reflective liquid crystal display elements 10R, 10G, and 10B can be uniformly illuminated at a similar degree. Incidentally, it is useful that the additional optical element includes at least one positive lens located between the dichroic mirror 6 and the mirror 7 or one positive lens located between the mirror 7 and the entrance-side polarizing plate 8.

In a case where stray color light is generated and is projected onto the projection surface upon a black display, an image formed on the projection surface stands out whitely, regardless of a black display. In this case, it is useful to adjust the quarter-wavelength plates 11R, 11G, and 11B to reduce, upon a black display, an amount of stray light (i.e., light projected onto the projection surface upon a black display).

Although unpolarized light emitted from the light source 1 is converted by the polarization conversion element (not shown) into p-polarized light in the first exemplary embodiment, apparently, the unpolarized light can be converted into s-polarized light as an alternative.

Although a polarizing beam splitter including a polarization splitting surface having a polarization splitting characteristic illustrated in FIG. 2 is used as the second polarizing beam splitter 13 in the first exemplary embodiment, the second polarizing beam splitter according to the present invention is not limited thereto. More specifically, a polarizing beam splitter including a polarization splitting surface having a polarization splitting characteristic for red light, which is an inverse of a polarization splitting characteristic for blue light, can be used as the second polarizing beam splitter 13. In this case, advantages similar to those of the first exemplary embodiment can be obtained by exchanging the position between the reflective liquid crystal display element 10R for red and the reflective liquid crystal display element 10B for blue.

Generally, most polarization splitting surfaces (or elements) have substantially the same polarization splitting characteristic (e.g., a characteristic to reflect s-polarized light and to transmit p-polarized light) for light in the entire visible light wavelength range. The (first polarization splitting surface of the) first polarizing beam splitter 9 can be a general polarizing beam splitter that has such a polarization splitting characteristic as to reflect s-polarized light in the entire visible light wavelength range and to transmit p-polarized light in the entire visible light wavelength range.

However, the second polarizing beam splitter 13 according to the first exemplary embodiment slightly differs in polarization splitting characteristic from the first polarizing beam splitter 9. As illustrated in FIG. 2, the second polarizing beam splitter 13 transmits s-polarized red light and reflects p-polarized red light. Further, the second polarizing beam splitter 13 reflects s-polarized blue light and transmits p-polarized blue light. The polarization splitting characteristic of the second polarizing beam splitter 13 thus differs with the wavelength (or color) in the visible light wavelength range. A surface (or element) that has a polarization splitting characteristic to reflect s-polarized light and to transmit p-polarized light, or vice versa in the visible light wavelength range (more specifically, for one of a red color light flux, a green light flux, and a blue color light flux) even in a case where the polarization split characteristic differs with wavelength is referred to as a polarization splitting surface (or element).

Figure 6:
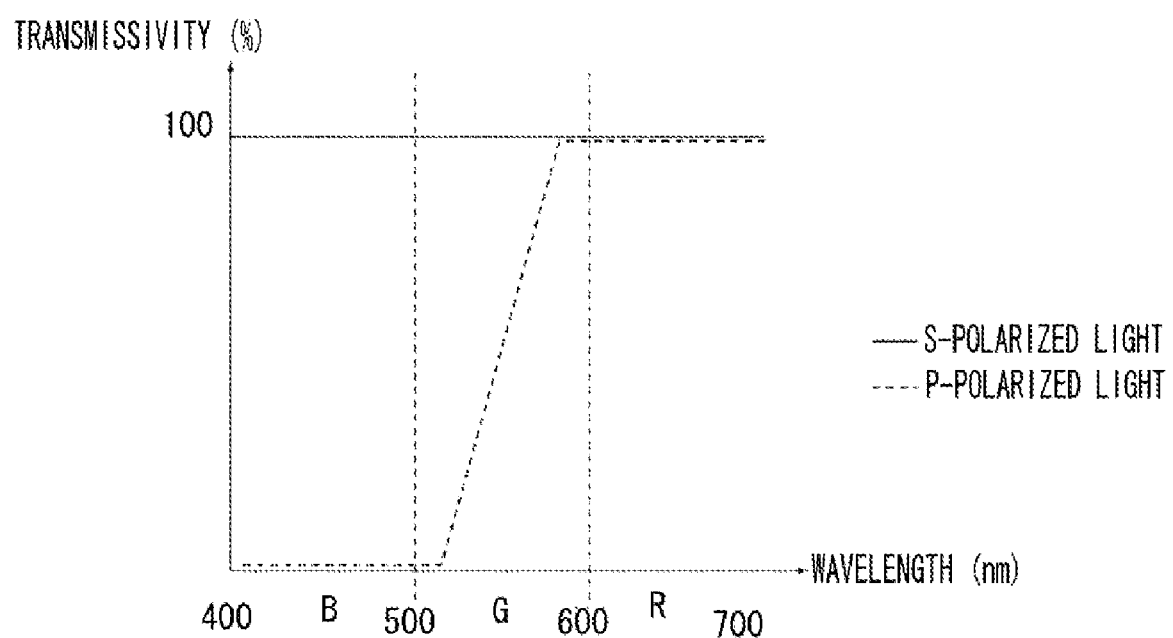
FIG. 6 illustrates a characteristic of a polarizing plate dedicated to blue light in the image projection apparatus according to the third exemplary embodiment of the present invention.

Also, a surface (or element) having a polarization splitting characteristic, which is described in detail in the following third exemplary embodiment and is illustrated in FIG. 6, is referred to as a polarization splitting surface (or element). That is, the polarization splitting surface transmits s-polarized light and reflects p-polarized light with respect to light in a given wavelength range (blue light in the case illustrated in FIG. 6). On the other hand, the polarization splitting surface transmits both s-polarized light and p-polarized light with respect to light in another wavelength range (red light in the case illustrated in FIG. 6). The term "reflect" means to reflect at least 50% (preferably 75%) of an amount of incident light. On the other hand, the term "transmit" means to transmit at least 50% (preferably 75%) of an amount of incident light.

In the first exemplary embodiment and the following other exemplary embodiments, the color light fluxes are assumed to be three color light fluxes, such as a red light flux, a green light flux, and a blue light flux. However, the color light fluxes according to the present invention are not limited thereto. Four or more color light fluxes can be used.

The polarizing plate described herein is an optical element configured to guide light having a predetermined polarization direction towards the subsequent optical system and to shield the subsequent optical system from light having a polarization direction perpendicular to the predetermined polarization direction (or to absorb light or to guide light to a direction different from a direction of the subsequent optical system). Although polarizing plates functioning for white light, i.e., for all of red light, green light, and blue light, have been described as the polarizing plates used in the first exemplary embodiment, the polarizing plates according to the present invention are not limited thereto. It is useful that the polarizing plates function for light in a wavelength range corresponding to the color light incident thereon.

With the above-described configuration of the image projection apparatus, red light and blue light are analyzed immediately after emerging from the reflective liquid crystal display elements 10R and 10B. Thus, even in a case where the number of components is small, the contrast of an image formed from red light and blue light is not decreased. That is, the first exemplary embodiment can provide a color combining optical system having a small number of components, which can provide high-contrast image light. Further, the first exemplary embodiment can provide an image projection apparatus having a small number of components, which can project a high-contrast projection image.

An optical element (e.g., the dichroic mirror 6) for separating white light into green light, red light, and blue light is provided in the color combining optical system as described in the first exemplary embodiment and the following embodiments. This is desirable for obtaining high-contrast. However, the configuration of the color combining optical system according to the present invention is not limited thereto. The optical paths of red light, green light, and blue light, which have been described in the first exemplary embodiment, can be interchanged with one another.

In the first exemplary embodiment, a light source for emitting green light can be located at a position closer to the light source 1 than the polarizing plate 8, and a light source for emitting blue light and red light can be located at a position closer to the light source 1 than the polarizing plate 12. Alternatively, a light source for emitting p-polarized green light can be located at the position of the polarizing plate 8, and a light source for emitting p-polarized blue light and p-polarized red light can be located at the position of the polarizing plate 12. With this configuration, further miniaturization of the color combining optical system can be achieved. Alternatively, a light source for emitting p-polarized green light can be located at the position of the polarizing plate 8 and, a light source for emitting s-polarized blue light and s-polarized red light can be located at the position of the polarizing plate 12. Then, the position of the liquid crystal display element 10R for red and the position of the liquid crystal display element 10B for blue can be interchanged. With this configuration, the half-wavelength plate 15 can be omitted. Consequently, the present invention can have an advantage in further reducing the number of components.

Second Exemplary Embodiment

Figure 3:
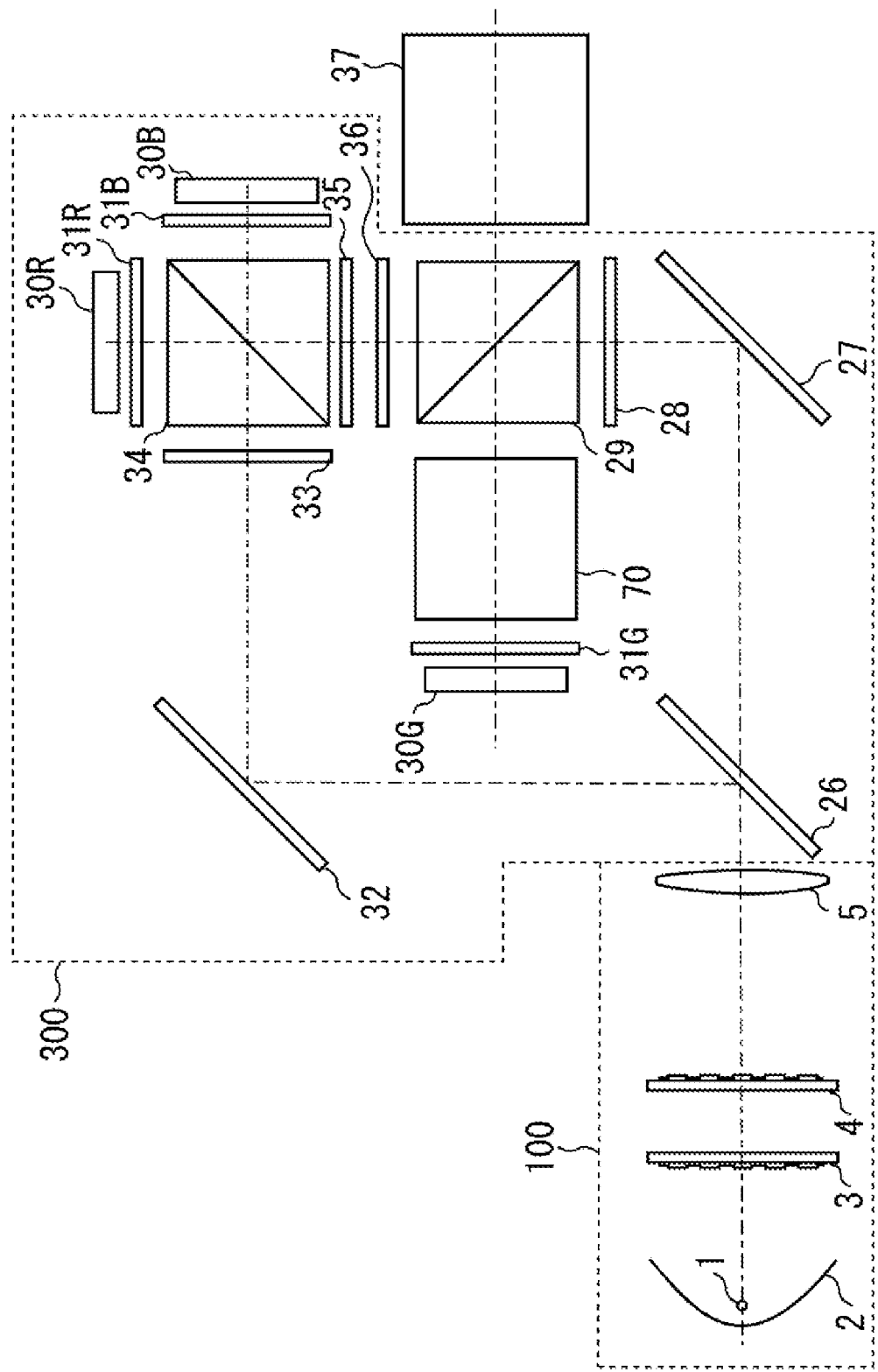
FIG. 3 illustrates a configuration of an image projection apparatus according to a second exemplary embodiment of the present invention.

A second exemplary embodiment of the present invention is described below with reference to FIG. 3. Components of the second exemplary embodiment, which are not specially described in the following description, are similar to corresponding components of the first exemplary embodiment.

A light source 1, a reflector 2, an illumination optical system 100, and a polarization conversion element (polarization converting element array (not shown)) are similar to those of the first exemplary embodiment. In the second exemplary embodiment, unpolarized light emitted from the light source is converted into s-polarized light by the polarization conversion element.

A color combining optical system 300 is described below with reference to FIG. 3. A dichroic mirror 26 has a characteristic to reflect blue light (B) and red light (R) contained in white light emitted from the light source and to transmit green light (G) contained in the white light.

An optical path of green light having passed through the dichroic mirror 26 is described below.

A mirror 27 reflects green light having passed through the dichroic mirror 26. An entrance-side polarizing plate (an entrance-side polarizing plate for green light, or a first entrance-side polarizing plate) 28 transmits only s-polarized light having an intended polarization direction, and absorbs or reflects p-polarized light having a polarization direction perpendicular to the intended polarization direction of the s-polarized light. A first polarizing beam splitter 29 has a polarization splitting surface (a surface on which a polarization splitting film is applied, or a surface across which two prisms face each other) that transmits p-polarized light and reflects s-polarized light.

A reflective liquid crystal display element 30G for green (green light) reflects incident light and performs image modulation. An optical element 31G is a quarter-wavelength plate. An optical path adjusting prism 70 adjusts an optical path, similar to the prism 70 in the first exemplary embodiment. Green light, which is s-polarized light reflected from the first polarizing beam splitter 29, is incident on a reflective liquid crystal display element 30G for green light via the optical path adjusting prism 70 and the quarter-wavelength plate 31G. The green light having been incident on the reflective liquid crystal display element 30G undergoes image modulation (for example, a part of the green light is modulated into p-polarized light). Then, the modulated light is reflected and is incident on the first polarizing beam splitter 29 again via the optical path adjusting prism 70 and the quarter-wavelength plate 31G. Further, s-polarized light contained in the green light having been incident on the first polarizing beam splitter 29 is reflected from the polarization splitting surface to be guided towards the light source 1. On the other hand, p-polarized light (image light) passes through the polarization splitting surface to be guided to a projection optical system 37. Thus, the image light obtained from the green light is projected by the projection optical system 37 onto a projection surface.

Optical paths of blue light and red light reflected from the dichroic mirror 26 are described below.

A mirror 32 reflects red light and blue light. The mirror 32 can be an optical element having a polarization splitting surface that reflects only s-polarized light and transmits p-polarized light. Red light and blue light reflected from the mirror 32 are incident on an entrance-side polarizing plate (an entrance-side polarizing plate for red light and blue light, a polarizing plate for white light, or a second entrance-side polarizing plate) 33, which transmits s-polarized light contained in the red light and the blue light and absorbs or reflects p-polarized light. The red light and the blue light, which have passed through the entrance-side polarizing plate 33, are incident on a second polarizing beam splitter 34 as s-polarized light.

The second polarizing beam splitter 34 has a wavelength characteristic (i.e., a polarization splitting characteristic, or a polarization splitting function) illustrated in FIG. 2, similar to the second polarizing beam splitter 13 described in the first exemplary embodiment. That is, the second polarizing beam splitter 34 has a polarization splitting characteristic for red light, which is an inverse of the polarization splitting characteristic for blue light.

Accordingly, the s-polarized blue light, which has been incident on the second polarizing beam splitter 34, passes through (the polarization splitting surface of) the second polarizing beam splitter 34 and is then incident on the reflective liquid crystal display element 30B for blue (blue light) via a quarter-wavelength plate 31B. Subsequently, the blue light modulated and reflected from the reflective liquid crystal display element 30B for blue (blue light) is incident on the second polarizing beam splitter 34 again via the quarter-wavelength plate 31B. The p-polarized light, into which the blue light having been incident on the second polarizing beam splitter 34 is modulated by the liquid crystal display element 30B, is reflected from the second polarizing beam splitter 34 and is guided towards the projection optical system 37.

The p-polarized red light, which has been incident on the second polarizing beam splitter 34, is reflected and is then incident on the reflective liquid crystal display element 30R for red (red light) via a quarter-wavelength plate 31R. Subsequently, the red light modulated and reflected from the reflective liquid crystal display element 30R for red is incident on the second polarizing beam splitter 34 again via the quarter-wavelength plate 31R. The p-polarized light, into which the red light having been incident on the second polarizing beam splitter 34 is modulated by the liquid crystal display element 30R, passes through the second polarizing beam splitter 34 and is guided towards the projection optical system 37.

Thus, the p-polarized light fluxes of red light and blue light, which have been guided towards the projection optical system 37 from the second polarizing beam splitter 34, are incident on an exit-side polarizing plate 35, which transmits p-polarized light and absorbs or reflects s-polarized light. Then, p-polarized light exiting from the exit-side polarizing plate 35 is incident on a half-wavelength plate 36 to be converted into s-polarized light. Subsequently, the s-polarized light is incident on the first polarizing beam splitter 29. The first beam splitter 29 has a characteristic to reflect s-polarized light and to transmit p-polarized light. Consequently, both of s-polarized light fluxes of red light and blue light are reflected by the polarization splitting surface of the first polarizing beam splitter 29 and are then guided towards the projection optical system 37. Thus, the red light and the blue light are projected onto the projection surface.

Incidentally, the second exemplary embodiment is configured such that each color light is returned towards the light source 1 upon a black display, in a similar way to the first exemplary embodiment.

In the second exemplary embodiment, a lens can be located between the first polarizing beam splitter 29 and the reflective liquid crystal display element 30G for green. Alternatively, a lens can be located between the first polarizing beam splitter 29 and the second polarizing beam splitter 34. Alternatively, a lens can be located between the second polarizing beam splitter 34 and the reflective liquid crystal display element 30R for red. Alternatively, a lens can be located between the second polarizing beam splitter 34 and the reflective liquid crystal display element 30B for blue.

The second exemplary embodiment is configured such that s-polarized green light is incident on the first polarizing beam splitter 29 and s-polarized green light is incident on the reflective liquid crystal display element 30G for green. Upon a black display, green light is reflected from the reflective liquid crystal display element 30G while the polarization direction of green light is maintained. That is, even after being reflected from the reflective liquid crystal display element 30G, the green light is still s-polarized light. Thus, the green light is reflected again by the polarization splitting surface of the first polarizing beam splitter 29. Then, the reflected green light passes through the entrance-side polarizing plate 28 to return towards the light source 1. Generally, as compared with performance to analyze p-polarized light, performance to analyze s-polarized light is high. Thus, as compared with the first exemplary embodiment having a configuration in which p-polarized green light having high visibility is incident on a liquid crystal display element, green stray light towards the projection optical system 37 can be reduced. That is, the contrast of a projected image can be enhanced.

In the second exemplary embodiment, a light source for emitting green light can be located closer to the light source 1 than the polarizing plate 28. In addition, a light source for emitting blue light and red light can be located closer to the light source 1 than the polarizing plate 33. Alternatively, a light source for emitting s-polarized green light can be located at the position of the polarizing plate 28. In addition, a light source for emitting s-polarized blue light and s-polarized red light can be located at the position of the polarizing plate 33. With such a configuration, further miniaturization of the color combining optical system can be achieved.

Third Exemplary Embodiment

Figure 4:
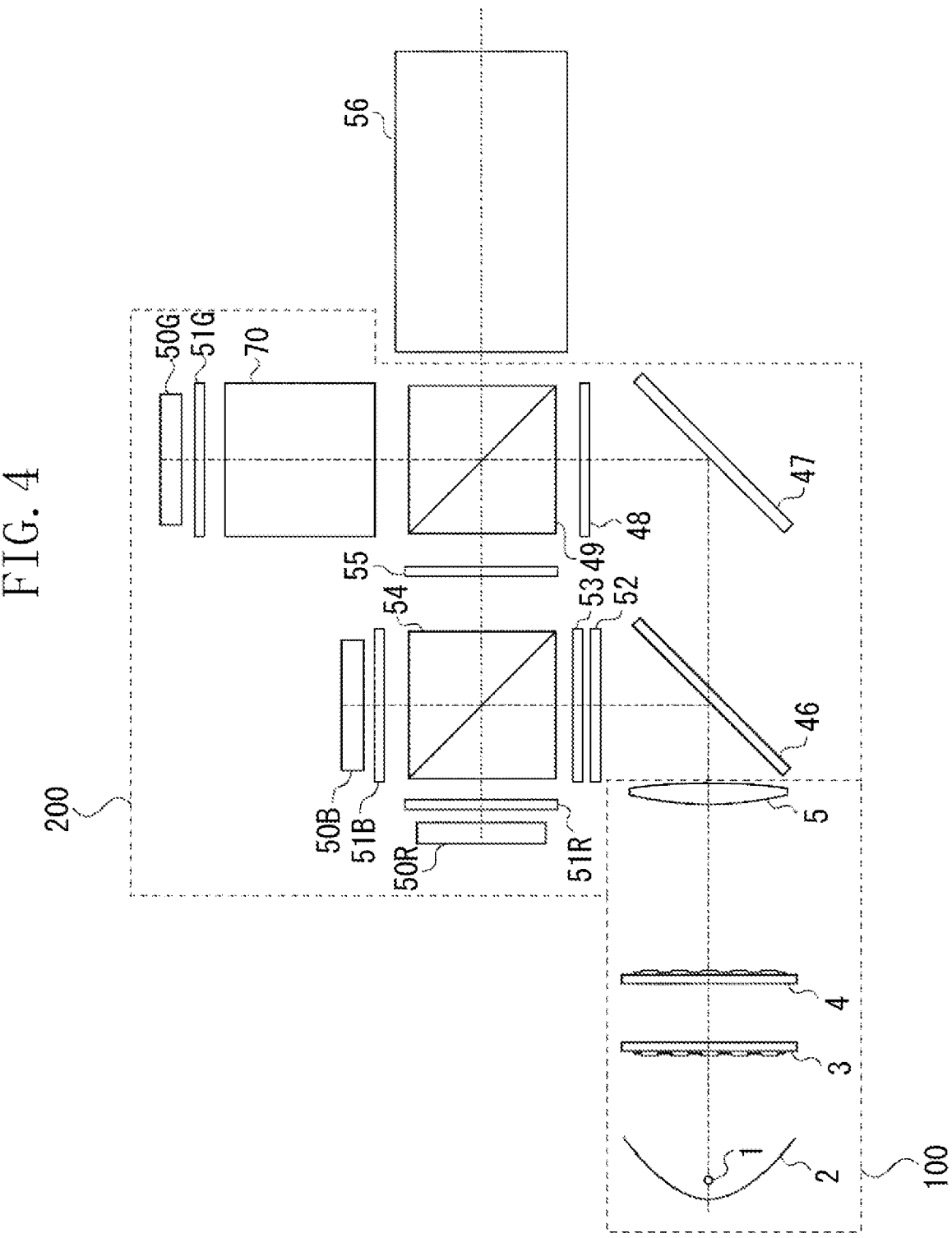
FIG. 4 illustrates a configuration of an image projection apparatus according to a third exemplary embodiment of the present invention.

A third exemplary embodiment of the present invention is described below with reference to FIG. 4. Components of the third exemplary embodiment, which are not specially described in the following description, are similar to those of the first exemplary embodiment.

A light source 1, a reflector 2, an illumination optical system 100, and a polarization conversion element (polarization converting element array (not shown)) are similar to those of the first exemplary embodiment. In the third exemplary embodiment, unpolarized light emitted from the light source is converted into p-polarized light by the polarization conversion element.

A color combining optical system 400 is described below with reference to FIG. 4. A dichroic mirror 46 has a characteristic to reflect blue light (B) and red light (R) contained in white light emitted from the light source and to transmit green light (G) contained in the white light.

An optical path of green light having passed through the dichroic mirror 46 is described below.

Figure 5:
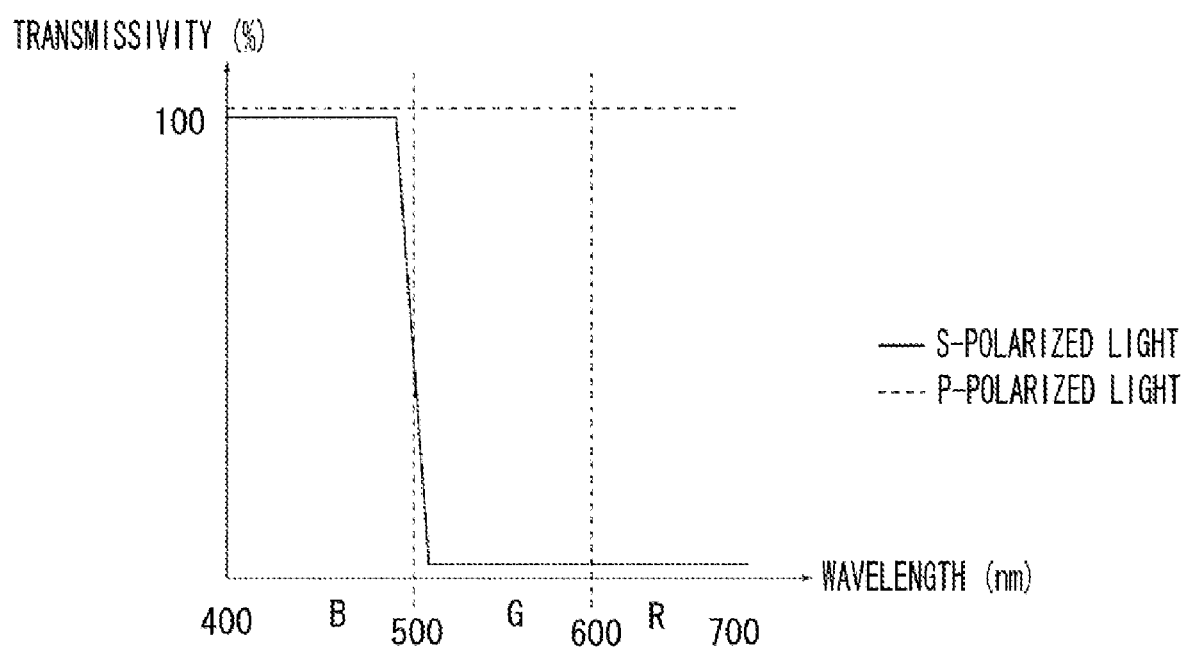
FIG. 5 illustrates a polarization split characteristic of a first polarizing beam splitter of the image projection apparatus according to the third exemplary embodiment of the present invention.

A mirror 47 reflects green light having passed through the dichroic mirror 46. An entrance-side polarizing plate (an entrance-side polarizing plate for green light, or a first entrance-side polarizing plate) 48 transmits only p-polarized light having an intended polarization direction, and absorbs or reflects s-polarized light having a polarization direction perpendicular to the intended polarization direction of the p-polarized light. A first polarizing beam splitter 49 has a polarization splitting surface characteristic illustrated in FIG. 5. That is, the first polarizing beam splitter 49 has a polarization splitting surface that transmits blue light, regardless of a polarization direction of the blue light (that is, transmits both of p-polarized blue light and s-polarized blue light), transmits p-polarized green light and p-polarized red light, and reflects s-polarized green light, and s-polarized red light.

A reflective liquid crystal display element 50G for green (green light) reflects incident light and performs image modulation. An optical element 51G is a quarter-wavelength plate. An optical path adjusting prism 70 adjusts an optical path. Further, p-polarized green light transmitted by the first polarizing beam splitter 49 is incident on the reflective liquid crystal display element 50G for green light via the optical path adjusting prism 70 and the quarter-wavelength plate 51G. The green light having been incident on the reflective liquid crystal display element 50G undergoes image modulation (for example, a part of the green light is modulated into s-polarized light). Then, the modulated light is reflected and is again incident on the first polarizing beam splitter 49 via the optical path adjusting prism 70 and the quarter-wavelength plate 51G. Further, p-polarized light contained in the green light having been incident on the first polarizing beam splitter 49 is reflected from the polarization splitting surface to be guided towards the light source 1. On the other hand, s-polarized light is reflected from the polarization splitting surface to be guided to a projection optical system 56. Thus, the image light obtained from the green light is projected by the projection optical system 56 onto a projection surface.

Optical paths of blue light and red light reflected from the dichroic mirror 46 are described below.

The red light and the blue light are incident on an entrance-side polarizing plate (an entrance-side polarizing plate for red light and blue light, a polarizing plate for white light, or a second entrance-side polarizing plate) 52, which transmits p-polarized red light and p-polarized blue light and absorbs or reflects s-polarized red light and s-polarized blue light. The red light and the blue light having passed through the entrance-side polarizing plate 52 are incident on a wavelength selective wave plate 53 as p-polarized light. The wavelength selective wave plate (color selective wave plate) 53 has a function of turning a polarization direction by 90° without changing the polarization direction of blue light (i.e., the wavelength selective wave plate 53 serves as a half-wavelength plate for red light). Accordingly, blue light exiting from the wavelength selective wave plate 53 remains as p-polarized light, while red light is converted into s-polarized light.

A second polarizing beam splitter 54 includes a polarization splitting surface having a characteristic to transmit p-polarized light fluxes of both of red light and blue light (for all of red light, green light, and blue light) and to reflect s-polarized light fluxes of red light and blue light. Accordingly, p-polarized blue light (illumination light) passes through (the polarization splitting surface of) the second polarizing beam splitter 54 and is incident on a reflective liquid crystal display element 50B for blue (blue light) via a quarter-wavelength plate 51B. Blue light modulated and reflected from the reflective liquid crystal display element 50B for blue is incident on the second polarizing beam splitter 54 again via the quarter-wavelength plate 51B. Further, s-polarized blue light (image light), which is obtained by the liquid crystal display element 50B by modulating blue light having been incident on the second polarizing beam splitter 54, is reflected from the second polarizing beam splitter 54 and is guided towards the projection optical system 56.

Moreover, s-polarized red light (illumination light) having been incident on the second polarizing beam splitter 54 is reflected and is then incident on a reflective liquid crystal display element 50R for red (red light) via a quarter-wavelength plate 51R. Then, red light modulated and reflected from the reflective liquid crystal display element 50R is incident on the second polarizing beam splitter 54 again via the quarter-wavelength plate 51R. Subsequently, p-polarized red light (image light) obtained by the liquid crystal display element 50R modulating red light having been incident on the second polarizing beam splitter 54 passes through the second polarizing beam splitter 54 and is guided towards the projection optical system 56.

Thus, p-polarized red light and s-polarized blue light guided from the second polarizing beam splitter 54 towards the projection optical system 56 are incident on a polarizing plate 55 dedicated to blue light (entrance-side polarizing plate dedicated to blue). The polarizing plate 55 dedicated to blue light (entrance-side polarizing plate) has a characteristic to transmit s-polarized blue light, to reflect or absorb p-polarized blue light, and to transmit red light, regardless of the polarization direction of the red light, as illustrated in FIG. 6. Thus, p-polarized red light (image light) and s-polarized blue light (image light) pass through the polarizing plate 55 dedicated to blue light. However, in a case where p-polarized blue light (unwanted light) is mixed thereinto, the p-polarized blue light is reflected or absorbed by the polarizing plate 55 to prevent the p-polarized blue light from being incident on the projection optical system 56.

Subsequently, the p-polarized red light (image light) and the s-polarized blue light (image light) are incident on the first polarizing beam splitter 49. The first polarizing beam splitter 49 has a polarization splitting surface that transmits (or reflects) blue light, regardless of the polarization direction of blue light, reflects s-polarized red light, and transmits p-polarized red light. Accordingly, in a case where s-polarized red light is mixed therewith, the s-polarized red light is reflected from the first polarizing beam splitter 49 and is guided to a direction different from the direction of the projection optical system 56.

Consequently, the p-polarized red light (image light) and the s-polarized blue light (image light) pass through the first polarizing beam splitter 49. The s-polarized green light (image light) is reflected by the first polarizing beam splitter 49. Thus, red light, green light, and blue light are combined with one another. Then, the combined light is guided to the projection optical system 56.

Incidentally, the third exemplary embodiment is configured such that each color light is returned towards the light source 1 upon a black display, in a similar way to the first exemplary embodiment.

In the third exemplary embodiment, a lens can be located between the first polarizing beam splitter 49 and the reflective liquid crystal display element 50G for green. Alternatively, a lens can be located between the first polarizing beam splitter 49 and the second polarizing beam splitter 54. Alternatively, a lens can be located between the second polarizing beam splitter 49 and the reflective liquid crystal display element 50R for red. Alternatively, a lens can be located between the second polarizing beam splitter 54 and the reflective liquid crystal display element 50B for blue.

Fourth Exemplary Embodiment

Although each of the above-described first, second, and third exemplary embodiments use one white light source (i.e., a light source for emitting white light, or a light source for emitting all of red light, green light, and blue light), the light source according to the present invention is not limited thereto. A plurality of light sources can be used as the light source according to the present invention. The system according to the present invention can use a light source corresponding to each color light. However, a fourth exemplary embodiment of the present invention includes two light sources, i.e., a light source for green light (first color light) and another light source for blue light and red light (second color light and third color light). The fourth exemplary embodiment is described below with reference to FIG. 7.

Figure 7:
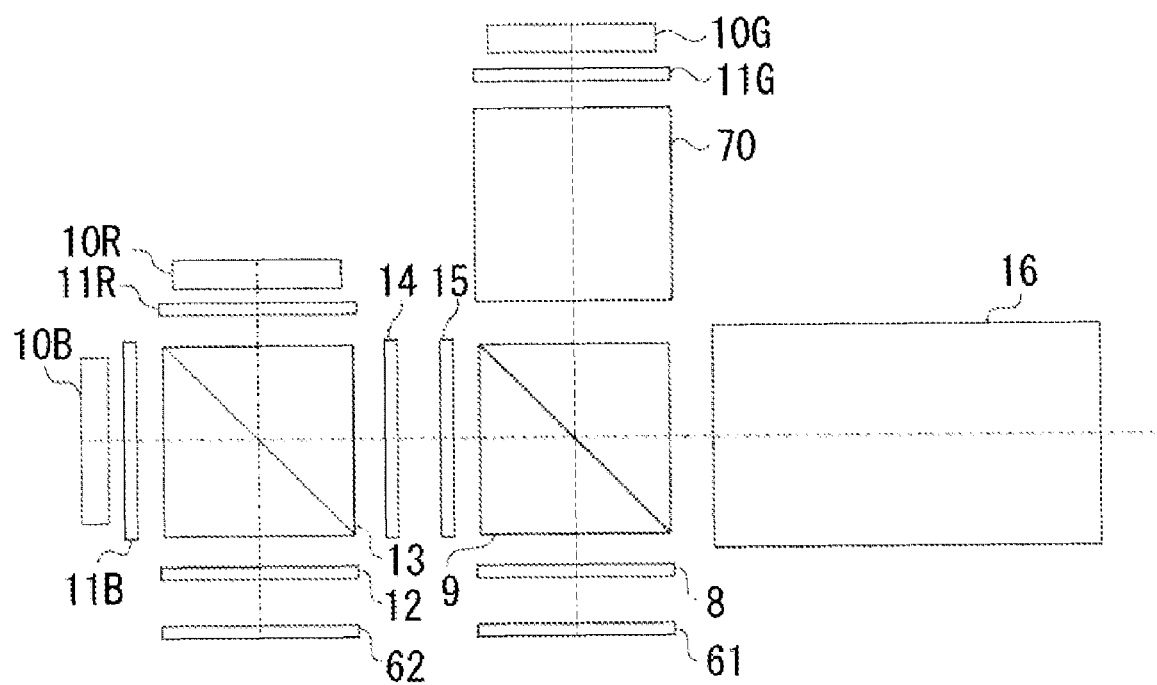
FIG. 7 illustrates an image projection apparatus according to a fourth exemplary embodiment of the present invention.

As illustrated in FIG. 7, an image projection apparatus includes a light source (first light source) 61 for green light (for first color light, or for light in a first wavelength range), and another light source 62 (second light source) for blue light and red light (for second color light and third color light, for light in second and third wavelength ranges, or for second and third liquid crystal display elements).

Each of the light source (the first light source) 61 for green light and the light source (the second light source) 62 for blue light and red light includes a plurality of light emitting diodes (LEDs).

Similar to the first exemplary embodiment, green light emitted from the light source 61 for green light passes through an entrance-side polarizing plate 8 (first entrance-side polarizing plate), which transmits p-polarized light and absorbs or reflects s-polarized light, and is then incident on a first polarizing beam splitter 9. Accordingly, substantially only green light is incident on the first polarizing beam splitter 9.

Similar to the first exemplary embodiment, blue light and red light emitted from the light source 62 for blue light and red light are incident on an entrance-side polarizing plate (second entrance-side polarizing plate) 12, which transmits p-polarized light and absorbs or reflects s-polarized light. Thus, a polarization degree of the incident light (i.e., a power ratio of desired polarized light components to total incident light) can be enhanced. Then, the blue light and the red light having passed through the entrance-side polarizing plate 12 are incident on a second polarizing beam splitter 13 (a polarizing beam splitter having a polarization split characteristic illustrated in FIG. 2). Consequently, substantially only p-polarized blue light and p-polarized red light are incident on the second polarizing beam splitter 13.

An optical operation of the fourth exemplary embodiment, which is performed after color light fluxes are incident on the first polarizing beam splitter 9 and the second polarizing beam splitter 13, is similar to a corresponding optical operation of the first exemplary embodiment. Thus, the description of such an optical operation of the fourth exemplary embodiment is not repeated.

Although a light source including a plurality of LEDs is used in the fourth exemplary embodiment, the light source according to the present invention is not limited thereto. A laser light source can be used. Alternatively, a combination of a white light source, such as a high-pressure mercury lamp, and a color filter can be used.

The above-described first through fourth exemplary embodiments can optionally be combined with one another. For example, the optical path adjusting prism 70 described in the second, third, and fourth embodiments can be either located at a position different from the position or replaced with a lens. Additionally, in the configuration of the second exemplary embodiment, a wavelength selective wave plate can be used, similar to the third exemplary embodiment.

The exemplary embodiments of the present invention can provide a color combining optical system capable of reducing the number of components and emitting high-contrast image light. In addition, the exemplary embodiments of the present invention can provide an image projection apparatus using such a color combining optical system capable of obtaining a high-contrast projection image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-114332 filed Apr. 24, 2007, which is hereby incorporated by reference herein in its entirety.

What is claimed is:

1. A color combining optical system comprising:
    a first polarization splitting surface having a polarization splitting characteristic for light in a first wavelength range; and
    a second polarization splitting surface having a polarization splitting characteristic for light in a second and third wavelength range,
    the first polarization splitting surface being configured to guide illumination light in the first wavelength range to a first liquid crystal display element and guide image light reflected from the first liquid crystal display element in a direction different to the direction of the illumination light,
    the second polarization splitting surface being configured to separate illumination light in the second wavelength range and illumination light in the third wavelength range from each other, to guide the illumination light in the second wavelength range to a second liquid crystal display element, and to guide the illumination light in the third wavelength range to a third liquid crystal display element, and to combine image light reflected from the second liquid crystal display element with image light reflected from the third liquid crystal display element to guide combined light to the first polarization splitting surface, and
    wherein the first polarization splitting surface is configured to combine the image light reflected from the first liquid crystal display element with the combined light obtained by the second polarization splitting surface combining the image light reflected from the second liquid crystal display element with the image light reflected from the third liquid crystal display element.

2. The color combining optical system according to claim 1, further comprising:
    a first entrance-side polarizing plate located closer to a light source side than the first polarization splitting surface and functioning as a polarizing plate for light in the first wavelength range; and
    a second entrance-side polarizing plate located closer to the light source side than the second polarization splitting surface and functioning as a polarizing plate for light in the second wavelength range and light in the third wavelength range.

3. The color combining optical system according to claim 1, further comprising an exit-side polarizing plate located between the first polarization splitting surface and the second polarization splitting surface and functioning as a polarizing plate for light in at least one of the second wavelength range and the third wavelength range.

4. The color combining optical system according to claim 1, wherein the second polarization splitting surface has a characteristic to transmit s-polarized light and reflect p-polarized light with respect to light in the second wavelength range, and to reflect s-polarized light and transmit p-polarized light with respect to light in the third wavelength range.

5. The color combining optical system according to claim 1, wherein the first polarization splitting surface has a characteristic to transmit first linear polarized light with respect to light in the first, second, and third wavelength ranges and to reflect second linear polarized light whose polarization direction is perpendicular to that of the first linear polarized light, and
    wherein the color combining optical system further comprises a half-wavelength plate located between the first polarization splitting surface and the second polarization splitting surface.

6. The color combining optical system according to claim 1, wherein a linear polarization direction of light in the first wavelength range incident from a light source side on the first polarization splitting surface, a linear polarization direction of light in the second wavelength range incident from the light source side on the second polarization splitting surface, and a linear polarization direction of light in the third wavelength range incident from the light source side on the second polarization splitting surface are the same as one another.

7. The color combining optical system according to claim 1, wherein the polarization direction of light in the second wavelength range and the polarization direction of light in the third wavelength range that are incident on the second polarization splitting surface are perpendicular to each other,
    wherein the second polarization splitting surface has a characteristic to transmit first linear polarized light with respect to light in the second wavelength range and light in the third wavelength range and to reflect second linear polarized light whose polarization direction is perpendicular to that of the first linear polarized light, wherein the color combining optical system further comprises a polarizing plate located between the first polarization splitting surface and the second polarization splitting surface and configured to polarize light in the second wavelength range and to transmit the first linear polarized light and the second linear polarized light in the third wavelength range, and wherein the first polarization splitting surface has a polarization splitting function for light in the first wavelength range and light in the third wavelength range and has a characteristic to reflect or transmit both the first linear polarized light and the second linear polarized light in the second wavelength range.

8. An image projection apparatus comprising:

first, second, and third liquid crystal display elements;

a projection optical system configured to project image light from the first, second, and third liquid crystal display elements; and a color combining optical system configured to guide light from a light source to the first, second, and third liquid crystal display elements and to guide image light from the first, second, and third liquid crystal display elements to the projection optical system, the color combining optical system including, a first polarization splitting surface having a polarization splitting characteristic for light in a first wavelength range; and a second polarization splitting surface having a polarization splitting characteristic for light in a second wavelength range and light in a third wavelength range, wherein the first polarization splitting surface is configured to guide illumination light in the first wavelength range to a first liquid crystal display element and to guide image light reflected from the first liquid crystal display element in a direction different to a direction of the illumination light, wherein the second polarization splitting surface is configured to separate illumination light in the second wavelength range and illumination light in the third wavelength range from each other, to guide the illumination light in the second wavelength range to a second liquid crystal display element and the illumination light in the third wavelength range to a third liquid crystal display element, and to combine image light reflected from the second liquid crystal display element with image light reflected from the third liquid crystal display element to guide combined light to the first polarization splitting surface, and wherein the first polarization splitting surface is configured to combine the image light reflected from the first liquid crystal display element with the combined light obtained by the second polarization splitting surface combining the image light reflected from the second liquid crystal display element with the image light reflected from the third liquid crystal display element.

9. The image projection apparatus according to claim 8, further comprising:

a first light source configured to emit light in the first wavelength range; and a second light source configured to emit light in the second wavelength range and light in the third wavelength range, wherein the first liquid crystal display element is illuminated with illumination light emitted from the first light source, and wherein the second liquid crystal display element and the third liquid crystal display element are illuminated with illumination light emitted from the second light source.

* * * * *